United States Patent Office 3,072,612
Patented Jan. 8, 1963

3,072,612
URANIUM COMPOUNDS AS CATALYSTS IN A PROCESS FOR PREPARING ESTERS
Brian W. Pengilly, Stow, Ohio, assignor to The Goodyear Tire & Rubber Company, Akron, Ohio, a corporation of Ohio
No Drawing. Filed Aug. 6, 1958, Ser. No. 753,435
9 Claims. (Cl. 260—75)

This invention relates to the preparation of glycol esters of polycarboxylic acids. More particularly this invention relates to an improvement in the method of preparing linear superpolyesters by the alcoholysis of esters of polycarboxylic acids with a glycol and the subsequent polymerization of these glycol esters to high polymeric linear polyesters.

In the preparation of linear superpolyesters, one of the most satisfactory methods from the standpoint of simplicity of reaction and economy of operation has been the ester interchange method in which the esters of the acids are reacted with a glycol to form the diglycol ester of the acid or a low molecular weight polymeric polyester which is then polymerized to a high molecular weight polymeric polyester by a condensation reaction with the splitting out of glycol. This process, however, has not been entirely satisfactory because the initial ester interchange reaction is slow and because many of the materials that catalyze this reaction are not effective as catalysts for the subsequent condensation reaction.

Heretofore, various materials have been proposed as catalysts for the ester interchange reaction between the esters of dicarboxylic acids and glycols and for the subsequent polymerization or condensation reaction. Metals in the form of powder, chips, ribbon or wire have been suggested, as have surface catalysts such as broken glass or silica gel. Among the more successful of the catalysts used in the past have been the alkaline materials such as the alkali metal and alkaline earth metal alcoholates, the alkali metal carbonates, or other alkali reacting salts, alkaline earth oxides, and litharge.

Many of these materials are effective catalysts for the initial simple ester interchange, and some of them catalyze the condensation reaction. However, many of the substances that catalyze the condensation reaction carry the polymerization only to a low degree or they do not promote the reaction effectively enough to give reaction rates acceptable for a commercial process.

According to the present invention, it has been found that uranium compounds catalyze ester interchange reactions between glycols and esters of polycarboxylic acids or mixtures of esters of such acids, accelerate the condensation polymerization of the bis glycol esters and permit the formation in relatively short reaction times of polyesters of high molecular weight which may be readily processed to form products having excellent properties, including good color, i.e., freedom from discoloration.

For example, terephthalate or isophthalate esters or a mixture thereof can be reacted with a glycol and the resultant glycol ester condensed to form a polymer, both stages of the reaction being carried out in the presence of a uranium compound. However, the bis glycol ester may be prepared by any other suitable method such as by reacting the sodium or potassium salt of the acid with ethylene chlorohydrin or by reacting the acid with a large excess of the glycol or by ester interchange using a catalyst which is a catalyst for the ester interchange but which is not a catalyst for the polymerization reaction. The bis ester or low molecular weight polymer thereof can then be polymerized according to the usual known techniques using a uranium compound as the catalyst.

The following examples illustrate the invention and show how it may be carried out.

Example 1

Twenty milliliters of ethylene glycol, 20 grams of dimethyl terephthalate, and 0.032 gram of anhydrous uranyl nitrate were placed in a glass tube having an inside diameter of 25 millimeters and were mixed together. The mixture was heated to 197° C. under nitrogen gas at atmospheric pressure. A slow stream of nitrogen was passed through the mixture at a rate of approximately 100 bubbles per minute. Stirring was accomplished by mechanically rotating the nitrogen inlet tube which was fitted with three pairs of blades. The alcoholysis reaction was substantially complete in three hours. At the conclusion of the alcoholysis reaction the pressure was gradually reduced to 0.1 millimeter of mercury while the unreacted glycol was distilled off. By controlling the rate of flow of nitrogen into the evacuated system, the pressure was controlled and maintained at from 0.1 to 0.5 millimeter of mercury. After one hour of condensation at 280° C. and 0.1 to 0.5 millimeter of mercury pressure, a polyester having a melting point of 260° C. and an intrinsic viscosity of 0.424 (measured in a 60/40 phenyl/s-tetrachloroethane mixture at 30.0° C.) was obtained.

Example 2

Twenty milliliters of ethylene glycol, 12 grams of dimethyl terephthalate, 8 grams of dimethyl isophthalate, and 0.032 gram of anhydrous uranyl nitrate were mixed and reacted according to the method described in Example 1. The alcoholysis reaction was substantially complete in two hours. After two hours of condensation at 280° C. and 0.7 millimeter of mercury pressure, a light amber colored polymer having an intrinsic viscosity of 0.789 was obtained.

Example 3

Twenty milliliters of ethylene glycol, 20 grams of dimethyl terephthalate, and 0.016 gram of anhydrous manganous acetate were mixed and reacted according to the method described in Example 1. After one hour and ten minutes of condensation at 280° C. and 0.1 millimeter of mercury pressure, a polyester having a melting point of 262° C. and an intrinsic viscosity of 0.532 was obtained.

Example 4

Twenty milliliters of ethylene glycol, 20 grams of dimethyl terephthalate, 0.003 gram of anhydrous uranyl nitrate, and 0.008 gram of anhydrous manganous acetate were mixed and reacted according to the method described in Example 1. After one hour of condensation at 280° C. and 0.2 millimeter of mercury pressure a polymer of excellent color having an intrinsic viscosity of 0.729 was obtained.

Example 5

Twenty milliliters of ethylene glycol, 20 grams of dimethyl terephthalate, and 0.017 gram of sodium manganese uranyl acetate were mixed and reacted according to the method described in Example 1. After one hour of condensation at 280° C. and 0.01 millimeter of mercury pressure, a polymer of intrinsic viscosity 0.549 was obtained.

Example 6

Twenty milliliters of ethylene glycol, 12 grams of dimethyl terephthalate, and 8 grams of dimethyl isophthalate were mixed together and 0.0035 gram of uranium trioxide and 0.008 gram of manganous acetate were added. The mixture was reacted according to the method described in Example 1. After one hour of condensation at 280° C. and 0.1 millimeter of mercury pressure, a polymer of excellent color and an intrinsic viscosity of 0.683 was obtained.

Example 7

Twenty milliliters of ethylene glycol and 20 grams of dimethyl terephthalate were mixed together and 0.008 gram manganous acetate, 0.002 gram sodium methoxide and 0.003 gram of uranyl acetate were added. The mixture was reacted according to the method described in Example 1. After one hour of condensation at 280° C. and 0.8 to 1 millimeter of mercury pressure, a polymer of excellent color having an intrinsic viscosity of 0.704 and a melting point of 261° C. was obtained.

Example 8

Twenty milliliters of ethylene glycol and 20 grams of dimethyl terephthalate were mixed together and 0.003 gram of uranyl nitrate, 0.006 gram of zinc acetate and 0.001 gram of manganous acetate were added. The mixture was reacted according to the method described in Example 1. After one and one half hours of condensation at 280° C. and 0.2 millimeter of mercury pressure, a polymer of good color having an intrinsic viscosity of 0.937 and a melting point of 261° C. was obtained.

Example 9

Twenty-five grams of bis(betahydroxy ethyl) terephthalate containing 0.05% of manganous acetate were added to a glass tube having an inside diameter of 25 millimeters containing a solution of 0.0038 gram of uranyl sulfate dissolved in 0.5 milliliter of ethylene glycol. The glass tube was heated by means of a vapor bath at 244° C. and the mixture was homogenized with stirring under nitrogen gas at atmospheric pressure. The pressure was reduced to 1 millimeter of mercury pressure and was maintained at this pressure for 15 minutes. The vapor bath was then replaced by another vapor bath boiling at 273° C. After 50 minutes of condensation at 273° C. and 1 millimeter of mercury pressure a polymer of excellent color having an intrinsic viscosity of 0.839 was obtained.

Example 10

Twenty milliliters of ethylene glycol, 12 grams of dimethyl terephthalate, 8 grams of dimethyl isophthalate and 0.031 gram of uranium tetrachloride were placed in a glass tube having an inside diameter of 25 millimeters and heated at 197° C. for four hours. 0.0016 gram of manganous acetate dissolved in 1 ml. of ethylene glycol was added and the mixture was heated for an additional forty minutes at 197° C. The pressure was reduced and unreacted glycol was distilled off. The pressure was then reduced to 1 millimeter of mercury pressure and the temperature was raised to 265° C. After one and one half hours of condensation at this temperature, an amber colored polymer was obtained. The polymer had an intrinsic viscosity of 0.596.

Example 11

Fifty grams of a 60/40 mixture of bis(betahydroxy ethyl) terephthalate and bis(betahydroxy ethyl) isophthalate containing 0.015 gram of zinc acetate were placed in a glass tube having an inside diameter of 25 millimeters. Then 0.008 gram of uranyl fluoride was added. The materials were heated and thoroughly mixed at 244° C. under a nitrogen atmosphere for 15 minutes. The pressure was reduced to 1 millimeter of mercury pressure and after 15 minutes the temperature was raised to 273° C. After one and one half hours of condensation at 273° C. and 0.7 millimeter of mercury pressure, a polymer of excellent color having an intrinsic viscosity of 0.616 was obtained.

Example 12

Fifteen grams of dimethyl terephthalate, 10 grams of dimethyl isophthalate, 0.009 gram of zinc acetate and 25 mls. of ethylene glycol were allowed to react according to the method described in Example 1. Ethylene glycol (12.5 mls.) was removed under reduced pressure and 0.0038 gram of uranyl sulfate in 0.5 ml. of ethylene glycol was added. The reactants were heated on a vapor bath at 244° C. and the pressure was reduced to 1.5 millimeter mercury. After 20 minutes at 244° C., the temperature was raised to 273° C. After one and a half hours at this temperature and a 0.2 millimeter of mercury pressure, a polymer of excellent color and having an intrinsic viscosity of 0.734 was obtained.

The practice of the invention has been illustrated with particular respect to polymeric ethylene terephthalate and 60/40 ethylene terephthalate-ethylene isophthalate copolyester. Polymeric ethylene isophthalate and copolymers containing various ratios of ethylene terephthalate to ethylene isophthalate can similarly be made using uranium compounds as catalysts. Also, polymeric esters of other dicarboxylic acids can be made. Representative examples of such acids are sebacic acid, adipic acid, azelaic acid, phthalic acid and the naphthalic acids. Other glycols can be used such as the propylene glycols, hexamethylene glycol, diethylene glycol, and 2,2-bis[4-(betahydroxy ethoxy)phenyl]propane. If desired, copolyesters can be formed by using mixtures of esters of the acids and one or more of the glycols or by using esters of one acid and a mixture of glycol. In addition to the dimethyl esters, other varieties such as the ethyl, propyl, butyl, and phenyl esters can be used. The preferred esters are the methyl esters of terephthalic acid and isophthalic acid.

The ester interchange reactions with which the catalysts can be used include those in which the glycol in a glycol ester of a dicarboxylic acid is displaced by a higher boiling glycol, as illustrated by the reaction of bis(betahydroxy ethyl) terephthalate with 2,2-bis[4-(betahydroxy ethoxy)-phenyl]propane to form, by ester interchange and condensation, copolymers containing the repeating units (A) 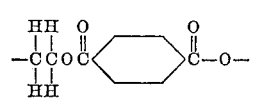

and (B) 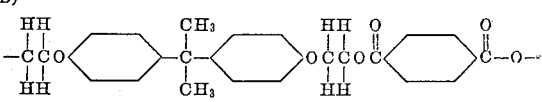

The preparation of such polymers is more fully described in copending application Ser. No. 667,269, filed June 21, 1957.

In the practice of the invention, various uranium compounds can be used. Representative examples of such compounds are uranyl nitrate, uranyl acetate, uranium trioxide, uranyl sulfate, uranium tetrachloride, uranium tetrafluoride, uranyl fluoride, and sodium manganese uranyl acetate. The amount of the uranium compound used may be varied over wide concentrations. As is usual with catalysts, the amount will be relatively small. As a general rule, the amount will be within the range of from 0.003 to 0.10% based on the dialkyl phthalate. The preferred range is from 0.002 to 0.08% based on the dialkyl phthalate to give a satisfactory reaction rate and a product of suitable viscosity and color.

The uranium compound can be used as the sole catalyst for the ester interchange and condensation reactions, or if desired, small amounts of another catalyst can be used to increase the rate of ester interchange and to assist in obtaining a polyester of higher viscosity in shorter reaction times. Thus, as illustrated in the above examples, small amounts of an alcoholysis catalyst such as manganous acetate have been found to have a synergistic effect when used in conjunction with the uranium compounds of this invention. The effect of a combination of manganous acetate and uranium nitrate gives faster reaction rates than either catalyst alone. This effect is illustrated by the results obtained in Examples 1, 3, and 4. In Example 4 in which a mixture of uranyl nitrate and manganous acetate was used as the catalyst, the polymer formed had a much higher viscosity than the polyesters formed in Example 1, in which uranyl nitrate was used as the sole catalyst and Example 3, in which manganous acetate was used as the sole catalyst, although the reaction times were approximately the same. A similar effect was obtained when a uranium compound was used with zinc acetate or a mixture of zinc acetate and manganous acetate.

The uranium compound can be added at the end of the initial ester interchange reaction but it is preferred to add it before this reaction has started or at least before it has progressed very far. Polyester made when the uranium compound is added in this manner is clear, whereas sometimes the polyester is cloudy when made with uranium catalyst added after the initial ester interchange reaction has been completed. It is thought that the uranium compound, and particularly salts of uranium, such as uranium tetrachloride, react with the glycol present in the initial ester interchange reaction mixture to form the glycollate and that this is the effective catalyst.

In the practice of the invention, the preparation of the glycol ester and its subsequent polymerization is, in general, carried out in accordance with the usual, known techniques. Thus, the reaction is preferably carried out in the absence of oxygen, generally in an atmosphere of an inert gas such as nitrogen or the like, in order to lessen darkening and to make it possible to obtain a high molecular weight pale or colorless product. Bubbling the inert gas through the reacting mixture serves the added functions of agitation and of expediting the removal of volatile components formed by the reaction. The polymerization or condensation reaction is carried out under reduced pressure, generally below 10 millimeters of mercury pressure and usually at or below 1 millimeter of mercury pressure at a temperature in the range of from 260 to 290° C., although other pressures and temperatures can be used, according to known practice.

While certain representative embodiments and details have been shown for the purpose of illustrating the invention, it will be apparent to those skilled in this art that various changes and modifications may be made therein without departing from the spirit or scope of the invention.

I claim:

1. In a process for preparing a bis glycol ester by subjecting at least one bis ester of an acid selected from the group consisting of methyl, ethyl, propyl, butyl and phenyl esters of terephthalic acid and isophthalic acid to alcoholysis in the presence of an excess of a glycol selected from the group consisting of polymethylene glycol containing from 2 to 6 methylene groups, diethylene glycol and 2,2 - bis[4(beta hydroxyethoxy)phenyl]propane the improvement which comprises reacting the bis ester with the glycol in the presence of from 0.003 to 0.10 percent of a uranium compound.

2. The process of preparing a linear superpolyester by subjecting at least one bis ester of an acid selected from the group consisting of methyl, ethyl, propyl, butyl and phenyl esters of terephthalic acid and isophthalic acid to alcoholysis in the presence of an excess of a glycol selected from the group consisting of polymethylene glycols containing from 2 to 6 methylene groups, diethylene glycol and 2,2 - bis[4(beta hydroxyethoxy)phenyl]propane and thereafter subjecting the bis glycol ester to condensation with the removal of glycol the improvement which comprises subjecting the bis ester to alcoholysis and condensing the glycol ester in the presence of from 0.003 to 0.10 percent of a uranium compound.

3. In a process for preparing a linear superpolyester by the self condensation with removal of glycol of a bis ethylene glycol ester of a dicarboxylic acid selected from the group consisting of terephthalic acid and isophthalic acid the improvement which comprises condensing the ester in the presence of from 0.003 to 0.10 percent of a uranium compound.

4. In a process for preparing a polyester by subjecting at least one bis ester of an acid selected from the group consisting of methyl, ethyl, propyl, butyl and phenyl esters of terephthalic acid and isophthalic acid to alcoholysis in the presence of an excess of ethylene glycol and thereafter subjecting the bis ethylene glycol ester thus formed to self condensation with the removal of ethylene glycol, the improvement which comprises reacting the bis ester with the glycol and condensing the glycol ester in the presence of from 0.003 to 0.10 percent of a uranium compound.

5. In a process for preparing an ethylene terephthalate-ethylene isophthalate copolyester by the self condensation with the removal of ethylene glycol of a mixture of bis ethylene glycol terephthalate and bis ethylene glycol isophthalate, the improvement which comprises conducting the condensation in the presence of from 0.003 to 0.10 percent of a uranium compound.

6. A process according to claim 1 in which the uranium compound is selected from the group consisting of uranyl nitrate, uranyl acetate, uranyl trioxide, uranyl sulfate, uranium tetrachloride, uranium tetrafluoride, uranyl fluoride and sodium manganese uranyl acetate.

7. The process according to claim 6 in which the uranium compound used is uranium tetrachloride.

8. The process of claim 6 in which the uranium compound used is uranyl nitrate.

9. The process of claim 6 in which the uranium compound used is uranium trioxide.

References Cited in the file of this patent

UNITED STATES PATENTS

| | | |
|---|---|---|
| 1,897,977 | Ellis | Feb. 14, 1933 |
| 2,195,362 | Ellis | Mar. 26, 1940 |
| 2,197,855 | Ellis | Apr. 23, 1940 |
| 2,206,022 | Britton et al. | July 2, 1940 |
| 2,585,223 | Caldwell | Feb. 12, 1952 |